United States Patent [19]

Walden

[11] 4,081,850

[45] Mar. 28, 1978

[54] PORTABLE TAPE PLAYER AND TAPE CONTAINER

[76] Inventor: Richard D. Walden, 225 Pecan Dr., Martinez, Ga. 30907

[21] Appl. No.: 708,984

[22] Filed: Jul. 27, 1976

[51] Int. Cl.² .......................... G11B 1/02; G11B 1/04
[52] U.S. Cl. .................................... 360/137; 224/5 H; 224/5 MA; 360/93
[58] Field of Search ...................... 360/92, 93, 94, 95, 360/96, 132, 137; 224/5 R, 5 S, 5 H, 5 A, 5 MA, 5 Q, 26 R, 26 B; 312/8, 9; 179/100, 11; 274/2; D14/6; D87/1 D

[56] References Cited

U.S. PATENT DOCUMENTS

| | | | |
|---|---|---|---|
| 1,208,945 | 12/1916 | Gell | 224/5 MA |
| 1,613,440 | 1/1927 | Carek | 224/5 MA |
| 2,571,514 | 10/1951 | Andrews | 224/5 H |
| 2,676,207 | 4/1954 | Hunt | 224/5 H |
| 3,631,994 | 1/1972 | Mackzum | 224/5 H |
| 3,869,722 | 3/1975 | Iwasaki | 360/92 |
| 3,879,758 | 4/1975 | Pyles | 360/92 |
| 3,943,564 | 3/1976 | Tushinsky | 360/137 |

Primary Examiner—Jay P. Lucas
Attorney, Agent, or Firm—Jones, Thomas & Askew

[57] ABSTRACT

The portable tape player and tape container includes an approximately rectangular, open top housing with speakers located adjacent the ends of the housing. A tape playback mechanism and an amplifier are located near one end of the housing, and the housing defines a concave recess for resting against the side of a human body. A strap is connected to the housing for suspending the housing from the shoulder of a human body, and a plurality of partitions divide the housing into compartments for receiving individual tape cartridges, etc.

1 Claim, 2 Drawing Figures

U.S. Patent  March 28, 1978  4,081,850
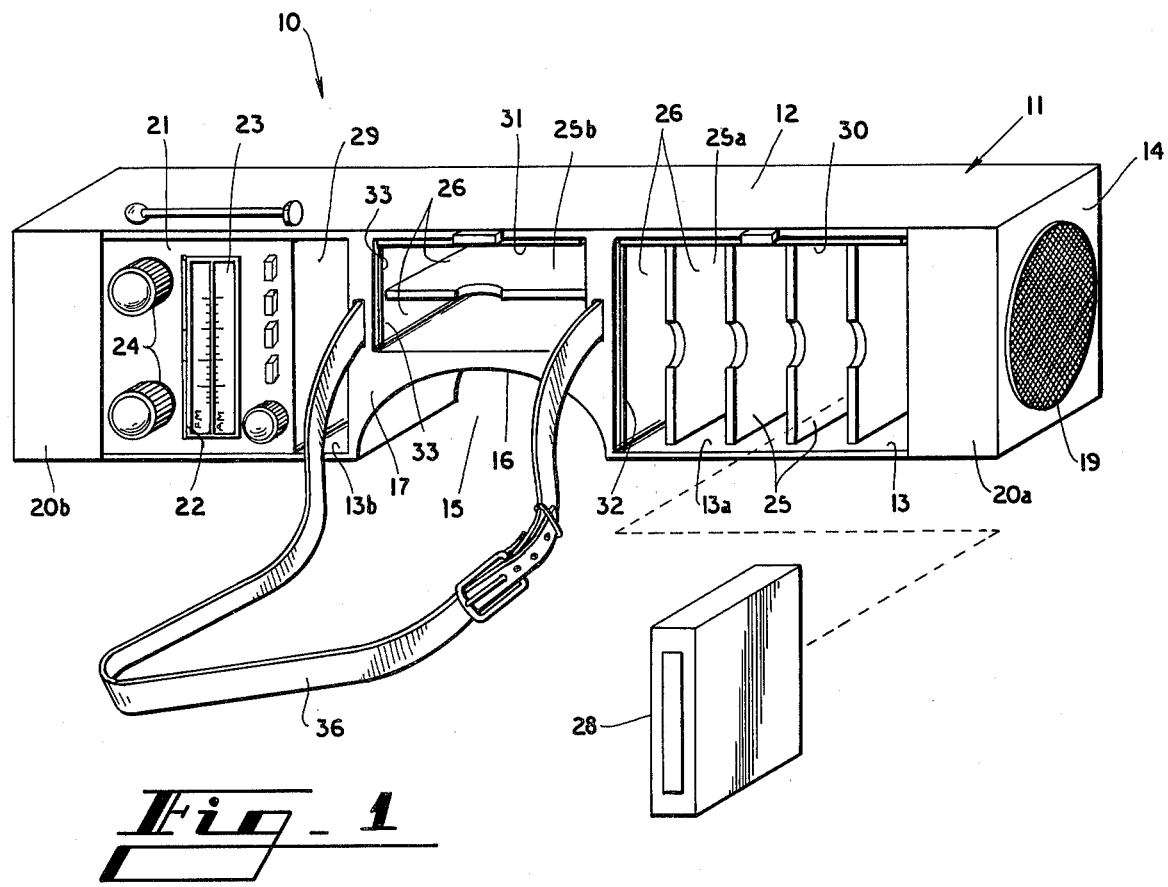
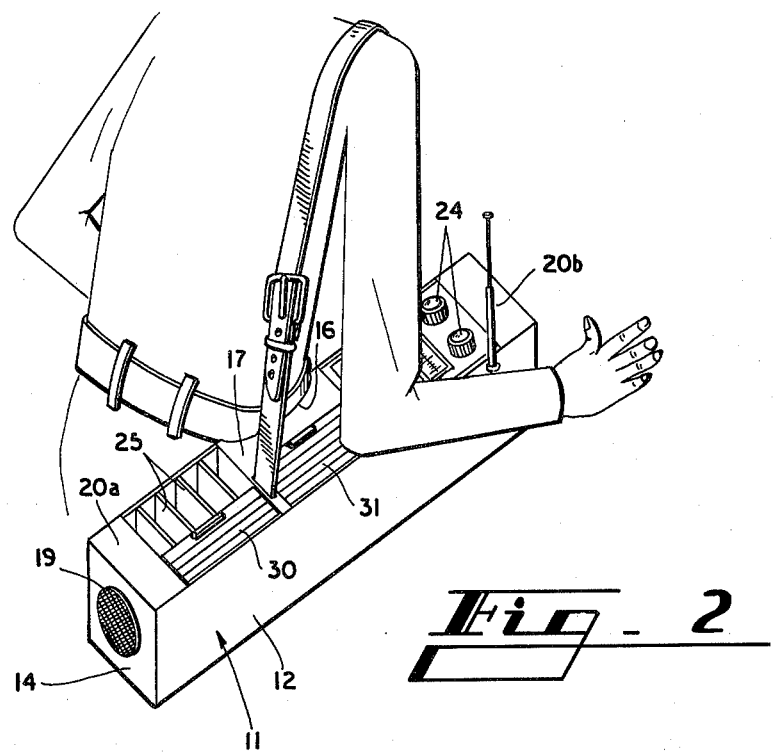

PORTABLE TAPE PLAYER AND TAPE CONTAINER

BACKGROUND OF THE INVENTION

Portable radios and tape players have become more popular in more recent years because of miniaturization evolved from transistors and other miniature electronic elements, and because of the requirement of only a small amount of power to operate the equipment. While the small radios of have experienced great economical success, portable tape players have been somewhat less commercially successful. The tapes for use with a portable tape player are usually expensive, and it is usually inconvenient to carry more than one step cartridge with the portable tape player.

SUMMARY OF THE INVENTION

Briefly described, the present invention comprises a portable tape player and tape container for playing and storing magnetic tapes, wherein the tape player and speakers are located in an open top housing and partitions divide portions of the housing into compartments for receiving and storing additional tape cartridges. A strap is connected to the housing for suspending the housing from the shoulder of the human body, and a recess is formed in a side portion of the housing for fitting against the side torso portion of the human body. The strap is connected to the housing in such a way that the housing is usually balanced in an approximately horizontal attitude when suspended from the shoulder of the body and the tape deck and amplifier are conveniently located within view and reach of the person carrying the housing.

Thus, it is an object of this invention to provide a portable tape player and tape cartridge container which can be conveniently carried by a person, which functions to play the magnetic tapes, and which provide a convenient and safe storage area for tapes that are not in use.

Another object of this invention is to provide a portable housing which carries a tape player and which forms a container for storing and carrying tape cartridges, with strap means for holding the housing in a balanced and convenient attitude at the side of a person when being transported.

Other objects, features and advantages of the present invention will become apparent when reading the following specification, when taken in conjunction with the accompanying drawing.

BRIEF DESCRIPTION OF THE DRAWING

FIG. 1 is perspective illustration of the portable tape player, showing the housing positioned on its side with its doors in their open positions, and with a tape cartridge suspended from the housing and ready for insertion in a compartment of the housing.

FIG. 2 is a perspective illustration of the portable tape player being carried by a person with the support strap extended over the shoulder of the person.

DETAILED DESCRIPTION OF AN EMBODIMENT

Referring now in more detail to the drawing, in which like numerals indicate like parts in both illustrations, FIG. 1 illustrates the portable tape player 10 which comprises an approximately rectangular housing 11 with spaced side walls 12 and 13, end walls 14 (only one shown), and a bottom wall (not shown). The side wall 12 and bottom wall each comprise a single sheet of material extending the full length of the housing, while the side wall 13 is formed into two sections 13a and 13b which are interrupted by recess 15. Side wall 13a is coplanar with side wall 13b. The recess 15 is formed by a concave cutout in the bottom wall (not shown) and a concave cutout 16 in central top panel 17 on the top surface of the housing. Openings 19 are formed in the end wall 14 and speakers (not shown) are located at the opposite ends of the housing 11 adjacent the openings 19. The speakers are enclosed by the bottom wall (now shown), side walls 12 and 13, and by end top panels 20a and 20b.

A conventional combination amplifier and tape cartridge receptacle or "deck" assembly of the type commercially available 21 is positioned near one end of the housing 11, behind speaker 20b. The amplifier and tape deck combination are of conventional construction and include a tape cartridge receiving slot 22 with a hinged door and stations scale 23, and control knobs and buttons 24. The face of the amplifier and tape deck is located at the top surface of the housing 11.

A plurality of partitions 25 are spaced throughout the remainder of the housing 11, with the partitions 25a extending normal to the length of the housing and parallel to the end walls 14 and with the partition 25b extending parallel to the length of the housing and parallel to the side walls 12 and 13. The partitions 25 form compartments 26 for receiving tape containers or cartridges 28. An additional compartment 29 is located between the recess 15 and the amplifier and tape container combination 21.

Flexible doors 30 and 31 are supported in housing 11 by means of tracks 32 and 33 at each edge of the door, and the doors can slide along the tracks 32 and 33 from a recessed position (FIG. 1), where the compartments 26 of the housing are open, to a closed or partially closed position (FIG. 2), where the compartments 26 are closed and the tape cartridges are confined in the housing.

A shoulder strap 36 is connected at its ends to housing 11 on opposite sides of the normal center of balance of the housing, with one strap end entering the open top housing 11 on one side of the compartments 26 and with the other end of the strap entering the open top housing on the opposite sides of the compartments 26. The shoulder strap 36 is adjustable in length and will normally be used by placing it on the shoulder of a person in the manner illustrated in FIG. 2, so that recess 15 of the housing 11 will receive and engage the side torso of the body of the person. The housing 11 will therefore usually be maintained in a balanced attitude with its open top facing upwardly and its lengths extending in an approximately horizontal attitude. The recess 15 helps to balance the housing against the body of the person carrying the housing so that the housing will not tend to sling or drift forwardly or rearwardly away from the body of the person as the person walks or bends during the normal motions of the body. When the housing 11 is to be removed from the body and placed on a table or other supporting surface, the housing can be positioned so that its controls and tape cartridges remain facing in an upward direction, or the housing can be turned on its side as illustrated in FIG. 1, where the controls and tape cartridges can be viewed from the side. The strap 36 can be inserted in a compartment 26 when the strap is not in use.

The amplifier and tape playback mechanism can be powered from a battery carried in the housing 11, or an external power source can be used, if desired. Such external power sources can be the normal household electrical service or a DC source from the cigarette lighter plug of an automobile, etc. The materials from which housing 11 are fabricated include any of the suitable plastic materials.

While this invention has been described in detail with particular reference to preferred embodiments thereof, it will be understood that variations and modifications can be effected within the spirit and scope of the invention as described hereinbefore and as defined in the appended claims.

I claim:

1. A portable tape player for storing and playing magnetic tapes comprising an approximately rectangular housing which includes a bottom wall, end walls and side walls, speakers mounted in said housing at opposite end walls of said housing and facing so that sound is projected from each speaker away from the housing, a tape playback mechanism, radio receiver and amplifying means all mounted within said housing adjacent one end of said housing, said tape playback mechanism, radio and amplifying means including controls extending toward the top portion of said housing, a plurality of compartments, of size sufficient to carry prerecorded tape cartridges, formed inside said housing, the opening to each compartment located at the top of said housing, said compartments having side walls extending perpendicular to said bottom walls of said housing, said compartments occupying space in said housing not obstructed by said speakers, tape playback mechanism, radio and amplifying means, means for carrying said player at the side of the human torso comprising a concave recess defined in one side wall of said housing of a size and shape to receive the side portion of a human torso, said concave recess being positioned between the ends of said housing, said tape playback mechanism, radio and amplifying means all being positioned to one side of said recess between said recess and one of said speakers, and strap means connected at its ends to said housing on opposite sides of said concave recess of said housing, whereby the strap means supports the tape player suspended from the shoulder of a human body and the concave recess engages the side of the body torso to stablize the housing during movement of the body.

* * * * *